United States Patent Office 2,907,582
Patented Oct. 6, 1959

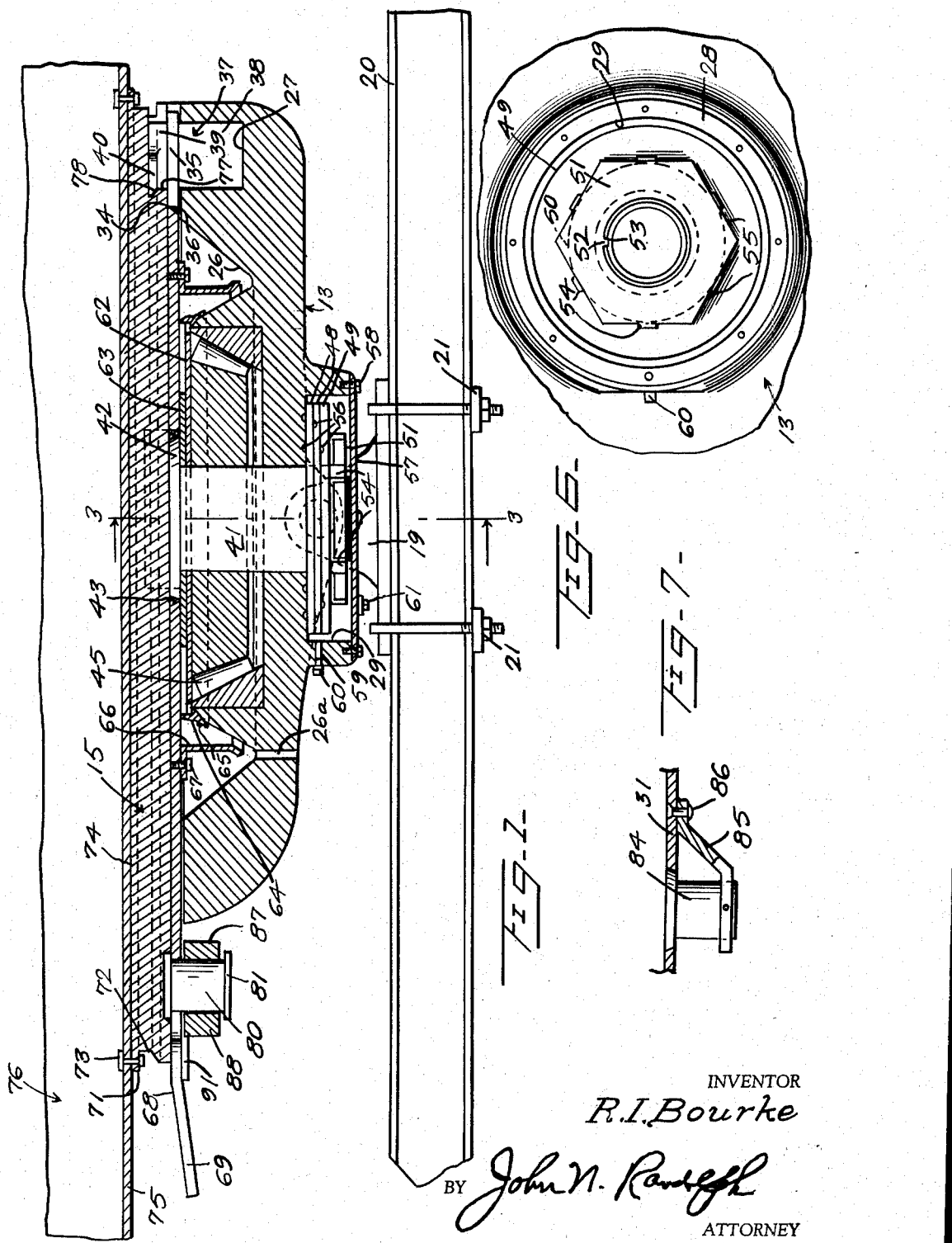

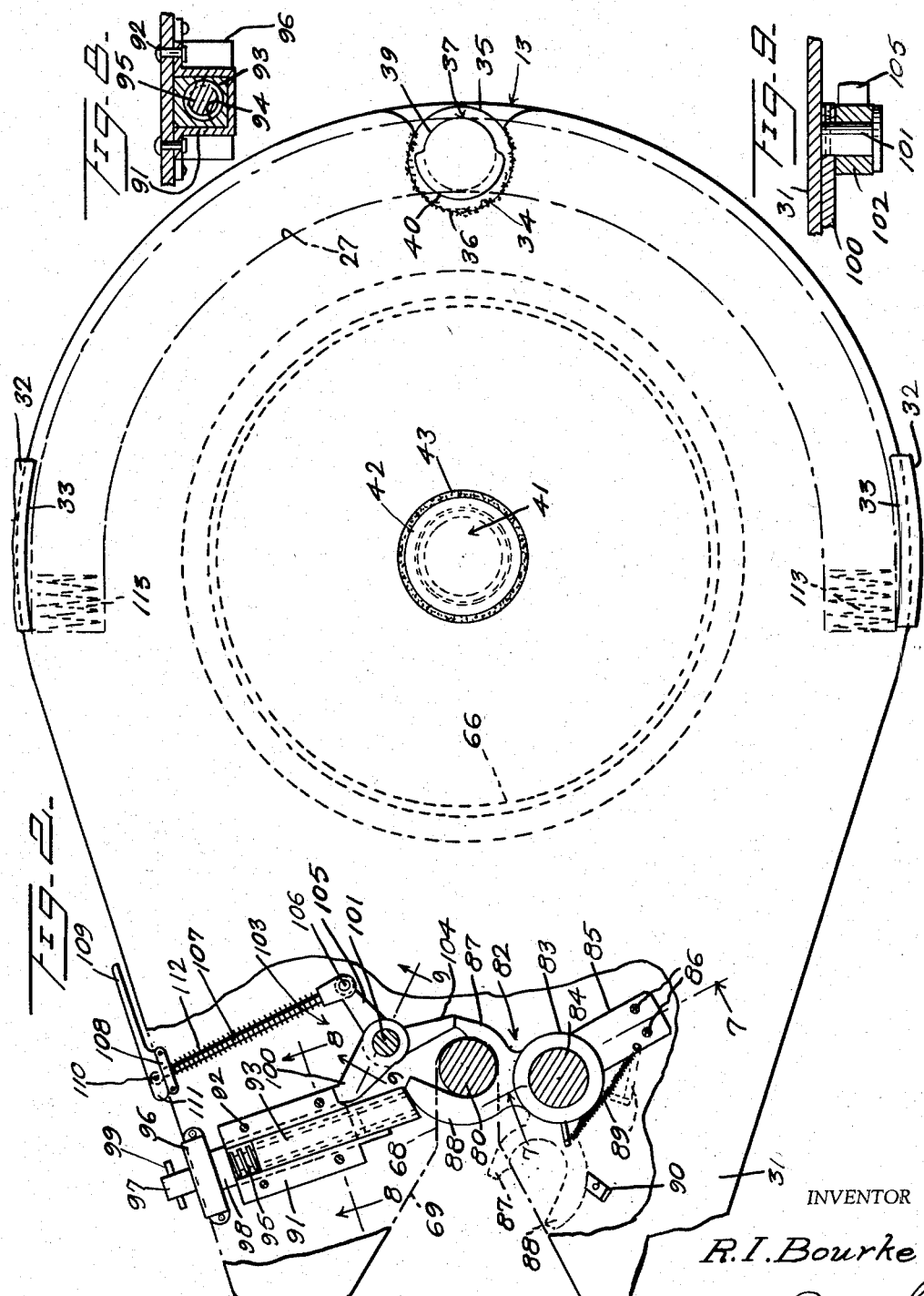

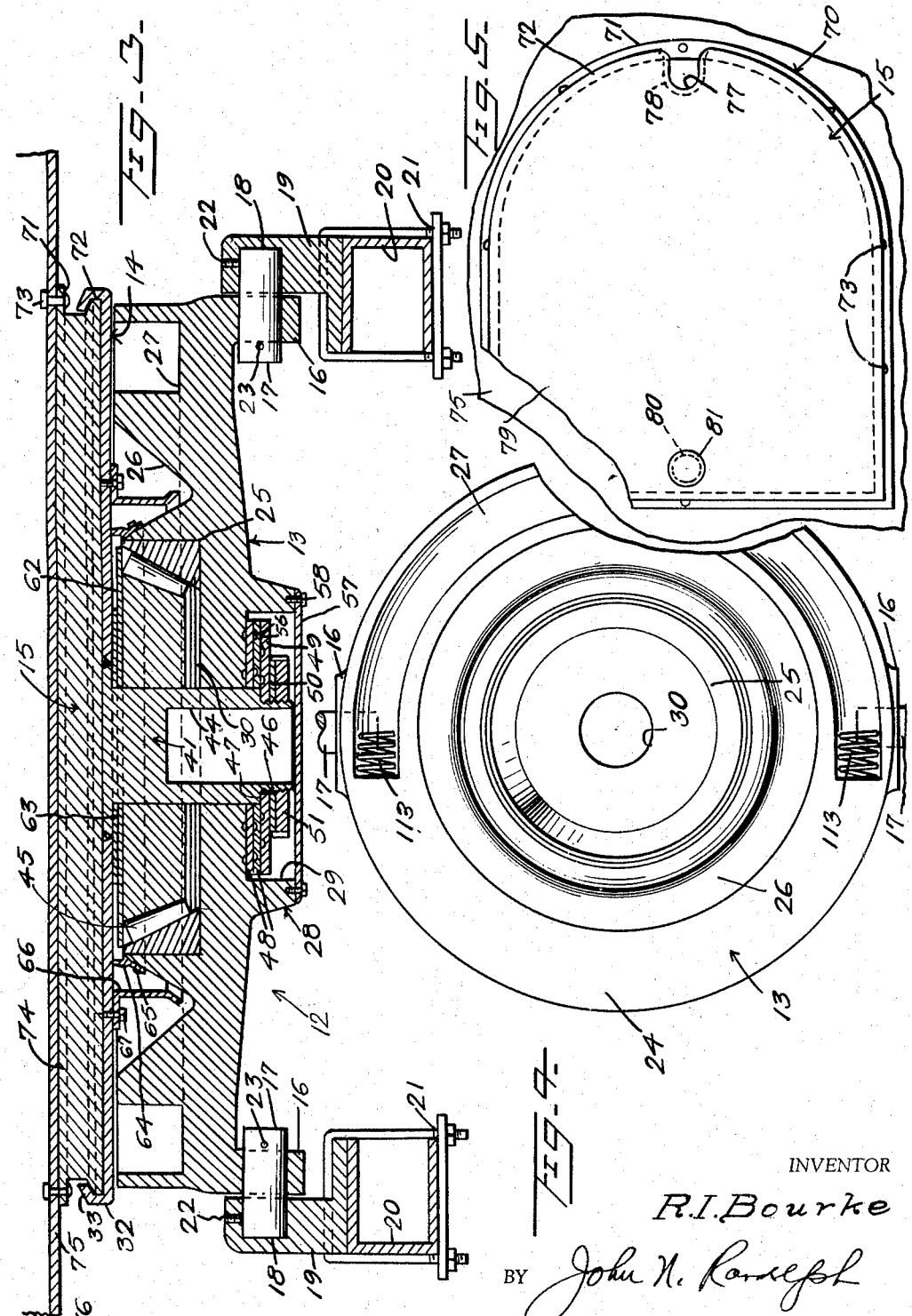

2,907,582

ANTI-JACKKNIFING FIFTH-WHEEL FOR TRACTOR TRAILER

Raymond I. Bourke, Houston, Tex.

Application December 3, 1958, Serial No. 777,897

8 Claims. (Cl. 280—432)

This invention relates to a novel construction of fifth wheel for connecting trailers to tractors in a manner to permit pivoting the tractor and trailer relative to one another about two axes disposed at right angles to one another.

More particularly, it is an object of the present invention to provide a novel fifth wheel construction which will effectively function to prevent "jackknifing" of a tractor trailer vehicle.

Another object of the invention is to provide a fifth wheel including a kingbolt or kingpin permanently carried by the part of the fifth wheel connected to the tractor, whereby the kingpin or kingbolt can be kept properly lubricated at all times to provide the maximum of ease to the tractor driver for steering the tractor trailer vehicle.

A further object of the invention is to provide a fifth wheel construction providing a multi-point securement between the fifth wheel parts carried by the tractor and trailer to minimize wear on the fifth wheel and to eliminate play between the detachably connected parts of the fifth wheel.

Various other objects and advantages of the invention will hereinafter become more fully apparent from the following description of the drawings, illustrating a presently preferred embodiment thereof, and wherein:

Figure 1 is a longitudinal, substantially central vertical sectional view showing the fifth wheel parts coupled;

Figure 2 is a top plan view, partly broken away and partly in section, showing the parts of the fifth wheel supported by the tractor;

Figure 3 is a central transverse vertical sectional view through the coupled fifth wheel, taken substantially along a plane as indicated by the line 3—3 of Figure 1;

Figure 4 is a fragmentary plan view on a reduced scale showing the bottom fifth wheel member detached;

Figure 5 is a fragmentary bottom plan view, on a reduced scale, of the top fifth wheel member;

Figure 6 is a fragmentary bottom plan view of the central portion of the bottom fifth wheel member, with one of the parts removed;

Figure 7 is a fragmentary sectional view taken substantially along the line 7—7 of Figure 2;

Figure 8 is an enlarged fragmentary cross sectional view illustrating a detail of the fifth wheel, taken substantially along a plane as indicated by the line 8—8 of Figure 2, and Figure 9 is a similar view taken substantially along a plane as indicated by the line 9—9 of Figure 2.

Referring more specifically to the drawings, the fifth wheel in its entirety and comprising the invention is designated generally 12 and generally includes a bottom fifth wheel member 13, an intermediate fifth wheel member 14, and a top fifth wheel member 15.

As best seen in Figures 1, 3 and 4, the bottom fifth wheel member 13 is substantially circular and is of substantial thickness. Said member 13 has depending bearing members 16 extending downwardly from diametrically opposite peripheral portions thereof and which are journaled on the inner ends of stub shafts 17. The outer ends of the stub shafts 17 seat in inwardly opening sockets 18 of bearing brackets 19 which rest upon transversely spaced parallel sills 20, forming parts of a conventional tractor, not otherwise shown. The bearing brackets 19 are secured by clamping fastenings 21 to the sills 20 for positioning said brackets 19 and the stub shafts 17 in transverse alignment with one another. The remote ends of the stub shafts 17 are secured by fastenings 22 to the sockets 18 and said stub shafts 17 may be provided with retaining elements 23 for engagement with the inner sides of the bearings 16.

The bottom fifth wheel member 13 has a substantially flat upper side 24 which is provided with a central recess 25 of substantial diameter. An annular gutter 26, of approximately V-shape cross section, as seen in Figures 1 and 3, surrounds the recess 25. The upper side 24 is also provided with an arcuate groove 27 constituting slightly more than a semicircle and which is disposed around the forward half thereof and outwardly with respect to the gutter 26. The bottom fifth wheel member 13 is of substantial thickness, as seen in Figures 1 and 3, and has a centrally disposed depending annular flange 28 at the bottom thereof forming a downwardly opening chamber 29. The fifth wheel member 13 has an opening 30 connecting the recess 25 and the chamber 29 and which is centrally disposed with respect thereto. A drain passage 26a extends downwardly from the bottom and rearmost portion of the gutter 26 and opens outwardly of the underside of the rear portion of the member 13, as seen in Figure 1.

The intermediate fifth wheel member 14 comprises a plate which is elongated and which is substantially flat except for a downwardly sloping rear end portion 31 thereof. The maximum width of said intermediate member 14 is approximately equal to the diameter of the bottom member 13. The intermediate member 14 at approximately the point of its maximum width has upstanding side edge portions 32 terminating in inturned lips 33 which are disposed above and spaced from the upper surface of the member 14. The forward end of the plate or member 14 is provided with a notch or recess 34 to receive a portion of a collar 35 which is secured therein, as by welding, as seen at 36. Said collar 35 is welded to a pin, designated generally 37, having a lower portion 38 which is sized to fit relatively snug but slidably in the groove 27. The pin 37 has a short portion 39 extending upwardly from the collar 35 and terminating at its upper end and about its rear half in an overhanging, approximately semicircular lip 40.

A kingbolt 41 has a head 42 at its upper end which is welded or otherwise secured, as seen at 43, in the plate 14, midway between the upturned edge portions 32, and so that the upper side of said head 42 is flush with the upper surface of the plate 14. The kingbolt 41 extends downwardly through the recess 25 and the opening 30 into the chamber 29, as seen in Figures 1 and 3. The lower portion of the kingbolt 41 may be hollow, as seen at 44 in Figure 3. The kingbolt 41 and thus the intermediate fifth wheel member 14 are mounted for free turning movement relative to the bottom fifth wheel member 13 by a roller bearing assembly 45 which is contained in the recess 25, around the upper portion of the kingbolt 41.

The lower end of the kingbolt 41, which is disposed in the chamber 29, is externally reduced and threaded, as seen at 46, to provide a surrounding annular downwardly facing shoulder 47. Two relatively thin discs 48, forming washers or shims, are disposed within the chamber 29 around the kingbolt 41, and above the shoulder 47. Said washers or shims 48 are supported by a thicker disc 49 which are disposed around the upper part of the threaded portion 46 and against the shoulder 47. A lock washer 50 is disposed beneath the disc 49 on the threaded bolt portion 46 and is supported by a nut 51 which is secured on the threaded portion 46 by said lock washer 50. As best seen in Figure 6, the lock washer 50 has an inwardly projecting tongue 52 which engages in a longitudinally extending groove 53 in the threaded portion 46, to prevent rotation of said washer 50 on the kingbolt 41. The periphery of the washer 50 has extensions 54 which are bent downwardly against the lands 55 of the nut 51 to prevent the nut from turning relative to the washer 50. All of the parts 48 to 51 are contained within the chamber 29. The underside of the member 13, defining the top wall of the chamber 29, and the upper surfaces of the washers 48 and disc 49 are provided with annular grooves 56 adapted to contain a lubricant. A bottom cover plate 57 is secured by fasentings 58 to the bottom edge of the annular flange 28 for closing the bottom of the chamber 29. The chamber 29 thus provides a lubricant receptacle which is filled through a filling port 59 with a suitable lubricant, not shown, such as gear oil. The port 59 is normally closed and sealed by a plug 60. The plate 57 has a removable drain plug 61 for draining the chamber 29.

An annular plate 62 may be positioned around the kingbolt 41 above the roller bearing assembly 45 and a shim 63 may be disposed on the kingbolt 41 between the plate 62 and the underside of the intermediate fifth wheel member 14 to support said member 14 out of contact with the bottom fifth wheel member 13. An annular shield 64 is secured by fastenings 65 to the upper part of the inner wall of the gutter 26 and extends upwardly therefrom to immediately below the underside of the intermediate member 14. An annular apron 66 is secured to the underside of the member 14 by fastenings 67 and extends downwardly into the gutter 26 and nearly to the bed thereof to provide a splash shield, as best seen in Figures 1 and 3.

The downwardly inclined rear end 31 of the intermediate member 14 is provided with a slot including a restricted forward slot portion 68 having a closed forward end and a flared rearwardly opening rear slot portion 69. The slot portion 68 is disposed in alignment with the kingbolt 41 and the recess 34.

The top fifth wheel member 15 comprises a thick plate having a rounded forward end 70 and a substantially flat underside 79. The marginal edge surrounding the plate 15 is recessed to provide a surrounding top flange 71 and a surrounding bottom flange 72, which is disposed beneath and spaced from the flange 71. Fastenings 73 extend through the top flange 71 for securing a flat upper face 74 of the plate 15 to the underside 75 of the forward portion of a trailer vehicle 76. The forwardmost central portion of the top fifth wheel member 15 is provided with a notch, as seen in Figures 1 and 5, including a notch portion 77 formed in the bottom flange or lip 72 and a deeper notch portion 78, formed in the part of the member 15, disposed immediately above the level of the flange 72, and beneath and spaced from the upper flange 71. Said notch portions 77 and 78 open forwardly of the member 15. An attaching pin or stud 80 is fixed to the member 15 and extends downwardly from the underside 79 thereof, and has an enlarged or flanged lower end 81, as seen in Figures 1 and 5. Said pin or stud 80 and the notch portions 77 and 78 are disposed in alignment with the longitudinal center of the top member 15.

A latch 82 has a ring shaped end 83 forming a bearing which is journaled on a pin 84 which is mounted in and extends downwardly from the rear plate portion 31, on one side of the slot 68. Said bearing portion 83 is supported on the pin 84 by a bracket 85 having one end secured to the underside of the plate portion 31 and an opposite end engaging the pin 84, below the bearing portion 83. Said bracket 85 is secured by fastenings 86 to the plate portion 31. The latch 82 has bifurcated opposite free ends composed of a furcation 87 and a longer furcation 88. A contractile spring 89 is anchored to the bracket 85 and connected to a part of the bearing portion 83 to urge the latch 82 to swing rearwardly and in a counterclockwise direction, as seen in Figure 2, away from the slots 68 and 69 and against a stop 90, which is secured to the underside of the plate portion 31, and in which position the furcation 87 extends partially across the open rear end of the slot 68, as seen in dotted lines in Figure 2.

An elongated channel shaped guide member 91 is secured by fastenings 92 to the underside of the plate portion 31, on the opposite side of the slot 68 for slidably supporting a bolt 93 for movement toward and away from the slot portion 68. Said bolt 93 is provided with a longitudinally extending threaded bore 94 opening outwardly of a rear end thereof and in which is received a feed screw 95. A bearing 96 is secured to the underside of the plate portion 31 beyond the outer end of the guide 91 for journaling an unthreaded outer part 97 of the feed screw 95. A collar 98 is fixed to the feed screw portion 97 between the bearing 96 and the adjacent end of the guide 91 to prevent movement of the feed screw 95 longitudinally of the guide 91. The outer end of the feed screw portion 97, which is disposed outwardly of the bearing 96, has tool receiving means 99 for rotating said feed screw for advancing or retracting the latch bolt 93 relative to the slot 68.

A bracket 100 is supported by and extends from a part of the inner end of the guide 91 for supporting a pin 101, as best seen in Figure 9, on which the hub 102 of a latch 103 is supported and journaled. The latch 103 includes arms 104 and 105 which project from the hub 102, at an obtuse angle to one another. The arm 105 is pivotally connected by a pin 106 to one end of a rod 107. Said rod extends slidably through a guide 108 which is secured to the underside of the plate portion 31. A lever 109 is pivotally connected by a pin 110 to the other end of said rod 107, near to but spaced from a rounded cam end 111 of said lever. A compression spring 112 is mounted on the rod 107 between the arm 105 and guide 108 for urging said rod inwardly for swinging the latch 103 clockwise, as seen in Figure 2, for causing the latch arm 104 to swing rearwardly toward the slot 68.

Assuming that the forward trailer end 76 is supported at a correct elevation for receiving the fifth wheel portions 13 and 14 beneath the fifth wheel portion 15, by rearward movement of the tractor supporting said fifth wheel portions 13 and 14, as the intermediate member 14 thus moves rearwardly relative to the top member 15, the underside 79 of the top member will engage the upper surface of the member 14. As the member 14 moves rearwardly, the overhanging lips 33 will initially engage over the bottom flange 72 and as the stud 80 is entering the slot 69. Thereafter, as said stud 80 enters the slot 68, the notch portions 77 and 78 will receive the portions 39 and 40, respectively, of the pin 37. Assuming that the stud latch 82 is in its open position, as seen in dotted lines in Figure 2, and that the bolt 93 is retracted, as the stud 80 enters the slot 68 it will engage the furcation 87 to cause the latch 82 to swing clockwise to its full line position of Figure 2, when the stud 80 has reached the closed forward end of the slot 68 and when the pin portions 39 and 40 are seated in the notch portions 77 and 78, respectively. As the stud latch 82 approaches its locking position, as seen in full lines in Figure 2, the furcation 87 thereof will strike the arm 104 for swinging the latch 103 counterclockwise by effecting an outward movement of the rod 107 and compression of the spring 112, until said furcation 87 clears the terminal of the arm 104. When this occurs, the spring will move the rod 107 inwardly for turning the latch 103 clockwise to its position of Figure 2 with the terminal of the arm 104 abutting the terminal of the furcation 87 for latching the stud engaging member 82 in its operative full line position and to provide a positive securement of the member 82, the feed screw 95 is turned to advance the bolt 93 inwardly against the furcation 88, as seen in Figure 2, to positively prevent swinging movement of the stud latch 82 to its inoperative dotted line position, without first retracting said bolt 93. Also, before the stud latch 82 can be moved to its inoperative position, the lever 109 must be swung counterclockwise to cause its cam portion 111 to move between the pivot 110 and guide 108 to retract the rod 107 outwardly for swinging the latch 103 counterclockwise so that the latch arm 104 will disengage the furcation 87.

It will thus be seen that the top member 15 is latched immovably to the intermediate member 14 at four points by the stud 80, the pin 37 and the two lips 33, so that no movement or play can exist between the fifth wheel parts 14 and 15 when thus coupled. However, the fifth wheel parts 14 and 15 as a unit may turn relative to the bottom fifth wheel part 13 about the axis of the kingbolt 41. As the parts 14 and 15 thus swivel relative to the member 13, the pin portion 38 travels in the groove 27 which restricts said swiveling movement through an arc of approximately 90°, or 45° in either direction from the normal intermediate position of the parts, as illustrated in the drawings, so that the fifth wheel 12 will effectively prevent "jackknifing" of a tractor trailer coupled thereby. The ends of the groove 27 are provided with heavy compression springs 113 to be engaged by the pin portion 38 at the extremities of its movement, to prevent said pin portion from striking solidly against the ends of the groove 27.

Unlike conventional fifth wheel assemblies, the fifth wheel 12 has a kingbolt which may be kept adequately lubricated at all times since the roller bearing assembly 45 can be packed in grease and is protected from moisture and dirt by the shields 64 and 66. Any moisture splashing between the members 13 and 14 will be caught in the gutter 26 and will be prevented from reaching the recess 25 or bearing 45 by the shields 66 and 64. Such moisture escapes from the gutter 26 through the drain port 26a.

It will also be understood that the fifth wheel assembly is capable of rocking movement relative to the sills 20 about the transverse axis as provided by the stub shafts 17.

Various modifications and changes are contemplated and may be resorted to, without departing from the function or scope of the invention as hereinafter defined by the appended claims.

I claim as my invention:

1. A fifth wheel for coupling a tractor to a trailer comprising a bottom member, a top member and an intermediate member, means connecting said bottom member to a portion of the tractor for rocking movement of said bottom member about a horizontal axis, a kingbolt fixed to and extending downwardly from said intermediate member and connected to and journaled in said bottom member for swively mounting the intermediate member on the bottom member, said top member being adapted to be secured to the underside of a forward portion of a trailer, means detachably securing said top member on said intermediate member and immovable relative thereto, said bottom member having an upwardly opening recess through which said kingbolt extends, and bearing means contained in said recess for journaling the kingbolt and supporting said intermediate member for free oscillating movement above and spaced from the bottom member.

2. A fifth wheel as in claim 1, said bottom member having a downwardly opening bottom chamber into which a lower end of the kingbolt extends, means detachably connected to the kingbolt and disposed within said bottom chamber to prevent upward displacement of the kingbolt and intermediate member relative to said bottom member.

3. A fifth wheel as in claim 2, means for closing and sealing the open lower end of said bottom chamber, and means for supplying a lubricant to said bottom chamber.

4. A fifth wheel as in claim 3, said bottom member having an upwardly opening annular drain gutter surrounding said upwardly opening recess, and a drain passage extending downwardly from a bottom portion of the gutter and opening through a portion of the underside of said bottom member.

5. A fifth wheel as in claim 4, an annular apron fixed to and extending downwardly from said intermediate member and supported thereby loosely within said drain gutter to provide a splash shield around said upwardly opening recess.

6. A fifth wheel as in claim 5, an annular shield fixed to an inner portion of said gutter and extending upwardly therefrom around an upper edge of said upwardly opening recess, and said shield terminating beneath and spaced slightly from said intermediate member and being surrounded by and spaced from said annular apron.

7. A fifth wheel for coupling a tractor to a trailer comprising a bottom member, a top member and an intermediate member, means connecting said bottom member to a portion of a tractor for rocking movement of the bottom member about a horizontal axis, means connecting and swively mounting the intermediate member on said bottom member, said top member being adapted to be secured to the underside of a forward portion of a trailer, means detachably securing said top member on said intermediate member and immovable relative thereto, said bottom member having an arcuate upwardly opening groove concentrically disposed relative to the axis of the swivel connection of the bottom member and intermediate member, and a pin fixed to said intermediate member having a lower portion slidably engaging in said groove for limiting movement of the intermediate member relative to the bottom member, said pin having an upper portion extending upwardly from the intermediate member, and said last mentioned means including an outwardly opening notch formed in the top member and in which the upper portion of said pin snugly engages.

8. A fifth wheel for coupling a tractor to a trailer comprising a bottom member, means connecting said bottom member to a portion of a tractor for rocking movement of the bottom member about a horizontal axis, a top member secured to the underside of a forward portion of a trailer, an intermediate member disposed between said bottom member and top member, a kingbolt fixed to and extending downwardly from said intermediate member, thrust bearing means contained within said bottom member in which said kingbolt is journaled and on which the intermediate member is swively supported, and means associated with the top member and intermediate member for slidably interlocking the top member immovably to said intermediate member.

References Cited in the file of this patent

UNITED STATES PATENTS

| 2,126,819 | Schawlem | Aug. 16, 1938 |
| 2,193,744 | Shriver | Mar. 12, 1940 |
| 2,400,738 | Brown | May 21, 1946 |
| 2,726,879 | Vaillant | Dec. 13, 1955 |

FOREIGN PATENTS

| 764,435 | Great Britain | Dec. 28, 1956 |